United States Patent
Li et al.

(10) Patent No.: US 12,335,839 B2
(45) Date of Patent: Jun. 17, 2025

(54) ELECTRONIC DEVICE, WIRELESS COMMUNICATION METHOD AND COMPUTER-READABLE STORAGE MEDIUM

(71) Applicant: Sony Group Corporation, Tokyo (JP)

(72) Inventors: Jian Li, Shanghai (CN); Tao Cui, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 344 days.

(21) Appl. No.: 17/802,162

(22) PCT Filed: Mar. 12, 2021

(86) PCT No.: PCT/CN2021/080345
§ 371 (c)(1),
(2) Date: Aug. 25, 2022

(87) PCT Pub. No.: WO2021/185157
PCT Pub. Date: Sep. 23, 2021

(65) Prior Publication Data
US 2023/0362780 A1 Nov. 9, 2023

(30) Foreign Application Priority Data
Mar. 19, 2020 (CN) .......................... 202010197186.X

(51) Int. Cl.
*H04W 40/20* (2009.01)
*H04W 84/00* (2009.01)

(52) U.S. Cl.
CPC .......... *H04W 40/20* (2013.01); *H04W 84/005* (2013.01)

(58) Field of Classification Search
CPC ..... H04W 40/20; H04W 84/005; H04W 4/12; H04W 4/40; H04W 28/02; H04W 40/22;
(Continued)

(56) References Cited

U.S. PATENT DOCUMENTS

2009/0285197 A1* 11/2009 Chen .................. H04W 40/30
370/351
2011/0227757 A1* 9/2011 Chen ................ G08G 1/096791
340/902
(Continued)

FOREIGN PATENT DOCUMENTS

CN 102625237 A 8/2012
CN 103475580 A 12/2013
(Continued)

OTHER PUBLICATIONS

International Search Report and Written Opinion mailed on Jun. 10, 2021, received for PCT Application PCT/CN2021/080345, filed on Mar. 12, 2021, 10 pages including English Translation.
(Continued)

*Primary Examiner* — Ayaz R Sheikh
*Assistant Examiner* — Tarell A Hampton
(74) *Attorney, Agent, or Firm* — XSENSUS LLP

(57) ABSTRACT

The present disclosure relates to an electronic device, a wireless communication method, and a computer-readable storage medium. The electronic device according to the present disclosure comprises a processing circuit and is configured to: determine one or more relay vehicles that must forward a message related to a vehicle; generate the message related to the vehicle, the message comprising information of the one or more relay vehicles; and send the message. By using the electronic device, wireless communication method, and computer-readable storage medium according to the present disclosure, the redundancy of information sending can be reduced while expanding the coverage range of a message so as to save on overhead and reduce interference, thereby optimizing a message sending process in the Internet of Vehicles.

11 Claims, 13 Drawing Sheets

(58) Field of Classification Search
CPC .... H04W 28/0236; H04L 5/00; H04L 5/0053; H04L 5/0073
See application file for complete search history.

(56) References Cited

U.S. PATENT DOCUMENTS

| | | | |
|---|---|---|---|
| 2013/0282263 A1* | 10/2013 | Tee | H04W 40/28 |
| | | | 701/527 |
| 2013/0325940 A1* | 12/2013 | Foti | G08G 1/096791 |
| | | | 709/204 |
| 2017/0132935 A1* | 5/2017 | Xu | H04W 4/029 |
| 2017/0215123 A1* | 7/2017 | Miranda d'Orey | H04W 4/44 |
| 2019/0042788 A1* | 2/2019 | Cho | G06F 16/29 |
| 2019/0244517 A1* | 8/2019 | Moustafa | G01C 21/3881 |
| 2020/0064140 A1* | 2/2020 | Tarkiainen | G05D 1/0291 |
| 2022/0105926 A1* | 4/2022 | Zhang | G08G 1/162 |

FOREIGN PATENT DOCUMENTS

| | | |
|---|---|---|
| CN | 103476006 A | 12/2013 |
| CN | 103763785 A | 4/2014 |
| CN | 108684065 A | 10/2018 |
| WO | 2017/209666 A1 | 12/2017 |

OTHER PUBLICATIONS

Wei et al., "Power-control-based Broadcast Scheme for Emergency Messages in VANETs", The 11th International Symposium on Communications & Information Technologies (ISCIT 2011), Dec. 31, 2011, pp. 274-279.

* cited by examiner

ELECTRONIC DEVICE, WIRELESS COMMUNICATION METHOD AND COMPUTER-READABLE STORAGE MEDIUM

CROSS-REFERENCE TO RELATED APPLICATIONS

This application is based on PCT filing PCT/CN2021/080345, filed Mar. 12, 2021, which claims priority to Chinese Patent Application No. 202010197186.X, titled "ELECTRONIC DEVICE, WIRELESS COMMUNICATION METHOD AND COMPUTER-READABLE STORAGE MEDIUM", filed on Mar. 19, 2020 with the China National Intellectual Property Administration, the entire contents of each are incorporated herein by reference in its entirety.

FIELD

The embodiments of the present disclosure relate to the field of wireless communications, and in particular to an electronic device, a wireless communication method, and a computer-readable storage medium. More specifically, the present disclosure relates to an electronic device as a road side unit (RSU) in a wireless communication system, an electronic device for a vehicle in a wireless communication system, a wireless communication method performed by a road side unit in a wireless communication system, a wireless communication method performed by an electronic device for a vehicle in a wireless communication system, and a computer-readable storage medium.

BACKGROUND

In communication processes of the Internet of Vehicles, sending messages in a broadcast mode is widely used in V2X (vehicle and other devices) communication scenarios, thereby forwarding the messages in real time and quickly. However, a large number of broadcast messages will cause severe interference, and redundant messages will be generated. In addition, high dynamics results in randomness and uncertainty of a vehicle node in receiving broadcast data. The vehicle source node that sends broadcast information does not know whether the information is sent successfully, and does not know the actual load of the entire network. Moreover, in some application scenarios, multi-hop transmission of the broadcast message is not supported resulting in limited coverage of messages.

Therefore, it is required to provide a technical solution to reduce the redundancy of information transmission while expanding coverage of messages, saving overhead and reducing interference, thereby optimizing message transmission processes in the Internet of Vehicles.

SUMMARY

A brief summary of the present disclosure is provided hereinafter, rather than a comprehensive disclosure of the full scope of the present disclosure or all features of the present disclosure.

According to the present disclosure, an electronic device, a wireless communication method, and a computer-readable storage medium are provided to reduce the redundancy of information transmission while expanding coverage of messages, saving overhead and reducing interference, thereby optimizing a message transmission process in the Internet of Vehicles.

According to an aspect of the present disclosure, an electronic device is provided. The electronic device includes processing circuitry. The processing circuitry is configured to: determine one or more relay vehicles required to forward a vehicle-related message; generate the vehicle-related message, where the message includes information about the one or more relay vehicles; and send the message.

According to another aspect of the present disclosure, an electronic device for a vehicle is provided. The electronic device for a vehicle includes processing circuitry. The processing circuitry is configured to: receive a vehicle-related message, where the message includes information about one or more relay vehicles required to forward the message; and forward the message in a case that the information about the one or more relay vehicles includes the electronic device.

According to another aspect of the present disclosure, a wireless communication method performed by an electronic device is provided. The wireless communication method includes: determining one or more relay vehicles required to forward a vehicle-related message; generating the vehicle-related message, where the message includes information about the one or more relay vehicles; and sending the message.

According to another aspect of the present disclosure, a wireless communication method performed by an electronic device for a vehicle is provided. The wireless communication method includes: receiving a vehicle-related message, where the message includes information about one or more relay vehicles required to forward the message; and forwarding the message in a case that the information about the one or more relay vehicles includes the electronic device.

According to another aspect of the present disclosure, a computer-readable storage medium is provided. The computer-readable storage medium includes executable computer instructions. The executable computer instructions, when executed by a computer, cause the computer to perform the wireless communication method according to the present disclosure.

According to another aspect of the present disclosure, a computer program is provided. The computer program, when executed by a computer, causes the computer to perform the wireless communication method according to the present disclosure.

With the electronic device, the wireless communication method and the computer-readable storage medium according to the present disclosure, information about one or more relay vehicles is added to the vehicle-related message. In this way, a vehicle serving as a relay node forwards the message and a vehicle not serving as a relay node may not forward the message, thereby reducing the redundancy of information transmission, saving signaling overhead and reducing interference. In addition, due to the existence of one or more relay nodes, multi-hop transmission of messages can be realized, thereby expanding coverage of messages. In summary, according to the embodiments of the present disclosure, the message transmission processes in the Internet of Vehicles can be optimized.

From the description provided herein, further areas of applicability will become apparent. Description and examples in this summary are only schematic and are not intended to limit the scope of the present disclosure.

BRIEF DESCRIPTION OF THE DRAWINGS

The drawings described herein are only illustrate the selected embodiments rather than all embodiments. The drawings are not intended to limit the scope of the present disclosure. In the drawing.

Figure 1:
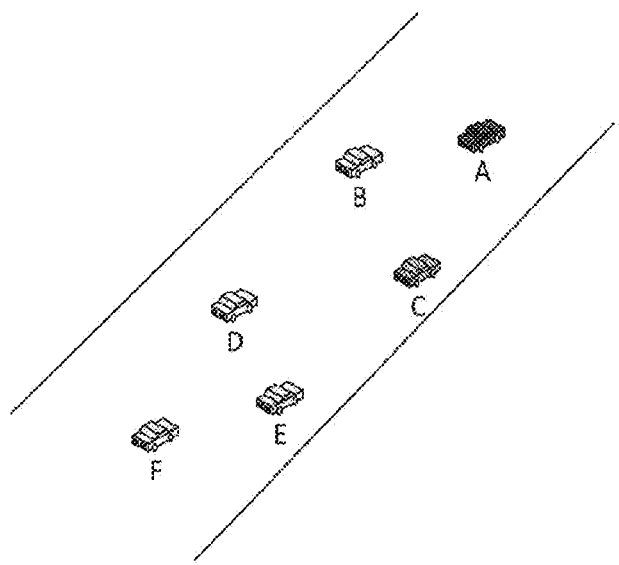
FIG. 1 is a schematic diagram showing an application scenario according to the present disclosure.

Although the present disclosure is susceptible to various modifications and alternative forms, specific embodiments thereof have been shown in the drawings as examples and are described in detail herein. However, it should be understood that the description of specific embodiments herein is not intended to limit the present disclosure to the disclosed particular forms, but rather to cover all modifications, equivalences and alternatives that fall within the spirit and scope of the present disclosure. It should be noted that same or similar reference numerals are used throughout the drawings to refer to the same or like parts.

DETAILED DESCRIPTION OF EMBODIMENTS

The embodiments of the present disclosure are to be described completely with reference to the drawings. The following description is merely exemplary, rather than intended to limit the present disclosure, and applications or usages of the present disclosure.

Exemplary embodiments are provided so that the present disclosure will be thorough and complete, and will fully convey the scope of the present disclosure to those skilled in the art. Numerous specific details, such as examples of specific components, devices, and methods, are described to provide a detailed understanding of the embodiments of the present disclosure. It will be apparent to those skilled in the art that exemplary embodiments may be implemented in many different forms without specific details, which should not be construed to limit the scope of the present disclosure. In some exemplary embodiments, well-known processes, well-known structures, and well-known technologies are not described in detail.

The description are provided in the following order:
1. Description of scenarios;
2. Configuration examples of an electronic device sending information;
3. Configuration examples of an electronic device receiving information;
4. Method embodiments; and
5. Application examples.

<1. Description of Scenarios>

FIG. 1 is a schematic diagram showing an application scenario according to the present disclosure. As shown in FIG. 1, there are vehicles A to F on a road, and all the vehicles are in motion. Communication between vehicles (V2V) may be performed by broadcasting, and communication between a vehicle and an RSU (V2X) may also be performed by broadcasting.

In the scenario shown in FIG. 1, although messages may be broadcasted in real-time and quickly, a large number of broadcast messages will cause severe interference and generate redundant messages. For example, after vehicle A broadcasts a message, vehicle B and vehicle C around vehicle A may both forward the message, and then vehicle D and vehicle E forward messages received from vehicle B and vehicle C, thereby resulting in a large number of redundant messages. In addition, assuming that multi-hop transmission of broadcast messages is not supported in this scenario, the message sent by vehicle A may not reach vehicle F, resulting in limited message coverage.

For this scenario, an electronic device in a wireless communication system, a wireless communication method performed by an electronic device in a wireless communication system, and a computer-readable storage medium are provided according to the present disclosure, reducing the redundancy of information transmission while expanding the coverage of messages, saving overhead, reducing interference, thereby optimizing a message transmission process in the Internet of Vehicles.

According to an embodiment of the present disclosure, the electronic device for sending vehicle-related information may be used in a vehicle. For example, the electronic device may be placed in a vehicle or may be a terminal device integrated in the vehicle.

According to an embodiment of the present disclosure, the electronic device for sending vehicle-related information may be used in an RSU. For example, the electronic device may be placed in an RSU or an electronic device integrated in the RSU. Further, the vehicle may communicate with a server located on a network side or a cloud through the RSU. Communication between the vehicle and the RSU may be performed by broadcasting.

According to an embodiment of the present disclosure, the electronic device for receiving vehicle-related information may be used in a vehicle.

<2. Configuration Examples of an Electronic Device Sending Information>

Figure 2:
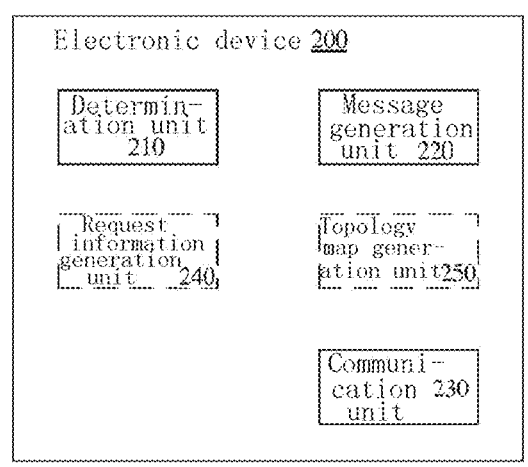
FIG. 2 is a block diagram showing a configuration example of an electronic device fir sending information according to an embodiment of the present disclosure.

FIG. 2 is a block diagram showing a configuration example of an electronic device 200 according to an embodiment of the present disclosure. The electronic device 200 may be an electronic device for sending a vehicle-related message, for example, an RSU in a wireless communication system, or may be an electronic device used in a vehicle.

As shown in FIG. 2, the electronic device 200 may include a determination unit 210, a message generation unit 220 and a communication unit 230.

All the units of the electronic device 200 may be included in a processing circuitry. It should be noted that the electronic device 200 may include one processing circuitry or multiple processing circuitry. Furthermore, the processing circuitry may include various discrete functional units to perform various different functions and/or operations. It should be noted that the functional units may be physical entities or logical entities, and units with different titles may be implemented by the same physical entity.

According to an embodiment of the present disclosure, the determination unit 210 may determine one or more relay vehicles required to forward a vehicle-related message.

According to an embodiment of the present disclosure, the message generation unit 220 may generate the vehicle-related message. The message includes information about the one or more relay vehicles.

According to an embodiment of the present disclosure, the electronic device 200 may send the message through the communication unit 230.

It can be seen that, with the electronic device 200 according to the embodiments of the present disclosure, information about one or more relay vehicles may be added to the vehicle-related message. In this way, a vehicle serving as a relay node forwards the message and a vehicle not serving as a relay node may not forward the message, thereby reducing the redundancy of information transmission, saving signaling overhead and reducing interference. In addition, due to the existence of one or more relay nodes, multi-hop transmission of messages can be realized, hereby expanding coverage of messages.

According to an embodiment of the present disclosure, the determination unit 210 may determine the one or more relay vehicles based on a real-time topology map in a predetermined range. The real-time topology map includes real-time position information of all vehicles in the predetermined range.

The predetermined range may be a range in which an device generating the real-time topology map can receive information. That is, the device generating the real-time topology map can receive vehicle state information from other vehicles in the predetermined range to generate the real-time topology map in the predetermined range. In addition, since the vehicles are in motion, the real-time topology map according to the present disclosure includes real-time positions of the vehicles. Therefore, the real-time topology map may reflect real-time information and topology information of the vehicles.

According to an embodiment of the present disclosure, the device generating the real-time topology map may be an RSU. That is, an RSU may receive vehicle state information from vehicles in the predetermined range (the predetermined range is a range in which the RSU receives information) to generate the real-time topology map. The vehicle state information includes, but is not limited to, position information, speed information and driving route information of the vehicles. The RSU may periodically receive the vehicle state information from the vehicles in the predetermined range.

As shown in FIG. 2, according to an embodiment of the present disclosure, the electronic device 200 may further include a request information generation unit 240. The request information generation unit 240 is configured to generate request information for requesting the real-time topology map. Further, the electronic device 200 may send the request information to the RSU through the communication unit 230, and receive the real-time topology map from the RSU in response to the request information. According to an embodiment of the present disclosure, the electronic device 200 may request the real-time topology map from the RSU in a case that the electronic device 200 wants to send the vehicle-related information or to perform vehicle-related operations based on the real-time topology map.

According to an embodiment of the present disclosure, the electronic device 200 may receive the real-time topology map from the RSU through the communication unit 230. For example, the electronic device 200 may receive the real-time topology map using a map message (MapData). According to an embodiment of the present disclosure, pseudo codes of the map message are shown as follows.

```
MapData ::= SEQUENCE {
          msgCnt MsgCount,
          timeStamp MinuteOfTheYear OPTIONAL,
          rlt Real-timeLocalTopology OPTIONAL,
          nodes NodeList,
          --intersections or road endpoints
          ...
}
```

In the pseudo codes, MapData represents the map message, rlt represents a real-time topology map element, and Real-timeLocalTopology represents the real-time topology map.

According to an embodiment of the present disclosure, the real-time topology map may include information of all the vehicles in the predetermined range. That is, the real-time topology map may be represented by using a vehicle node list, and the list includes all the vehicles in the predetermined range.

According to an embodiment of the present disclosure, pseudo codes of the real-time topology map are shown as follows.

Real-timeLocalTopology::=SEQUENCE (SIZE(1 . . . 32)) OF DF_Real-timeLocalTopologyElement In the pseudo codes, Real-timeLocalTopology represents a vehicle node list containing up to 32 vehicle nodes, and Real-timeLocalTopologyElement represents information of each of the vehicle nodes in the vehicle node list.

According to an embodiment of the present disclosure, information of each of the vehicle nodes includes, but is not limited to: position information of the vehicle node, speed information of the vehicle node, and communication quality information of the vehicle node. The information may be absolute information of each of the vehicle nodes. For example, the position information of each of the vehicle nodes may be absolute position information of the vehicle node, and the speed information of each of the vehicle nodes may be absolute speed information of the vehicle node. Alternatively, the information may be information relative to the electronic device 200 (that is, the device requesting the real-time topology map). That is, position information of a vehicle node may include a position of the vehicle node relative to the electronic device 200, speed information of the vehicle node may include a speed of the vehicle node relative to the electronic device 200, and communication quality information of the vehicle node may include communication quality of a link between the vehicle node and the electronic device 200. In addition, the communication quality includes but is not limited to a path loss and a signal to interference plus noise ratio (SINK).

According to an embodiment of the present disclosure, pseudo codes of information of each of the vehicle nodes are shown as follows.

```
Real-timeLocalTopology Element ::= SEQUENCE {
            refpos Position3D,
            speed AverageSpeed,
            pvalue PathlossValue,
            sinr SINRValue,
            ...
}
```

In the pseudo codes, Real-timeLocalTopologyElement represents information of a vehicle node, refpos represents a position information element of the vehicle node, Position 3D represents position information of the vehicle node, speed represents a speed information element of the vehicle node, AverageSpeed represents speed information of the vehicle node, pvalue represents a path loss element of the vehicle node, PathlossValue represents a path loss of the vehicle node, sinr represents an SINR element of the vehicle node, and SINRValue represents an SINR of the vehicle node.

In addition, according to an embodiment of the present disclosure, pseudo codes of position information of a vehicle node are shown as follows.

AverageSpeed::=INTEGER(0 . . . 65535)
    —unit is 0.01 m/s

In the pseudo codes, AverageSpeed represents the speed information of the vehicle node, which is an integer with a range from 0 to 65535 and a step size of 0.01 m/s.

According to an embodiment of the present disclosure, pseudo codes of a path loss of a vehicle node are shown as follows.

PathlossValue::=INTEGER (0 . . . 65535)
    —units of 0.1 dB

In the pseudo codes, PathlossValue represents the path loss of the vehicle node, which is an integer with a range from 0 to 65535 and a step size of 0.1 dB.

According to an embodiment of the present disclosure, pseudo codes of an SINR of a vehicle node are shown as follows.

SINRValue::=INTEGER (0 . . . 65535)
    —units of 0.1 dB

In the pseudo codes, SINRValue represents the SINR of the vehicle node, which is an integer with a range from 0 to 65535 and a step size of 0.1 dB.

As described above, according to the embodiments of the present disclosure, in a case that the electronic device 200 is used for a vehicle, the electronic device 200 may receive the real-time topology map from the RSU using map information. Thus, the electronic device 200 may select a relay vehicle based on the real-time topology map and then sends the vehicle-related information, and may perform other vehicle-related operations based on the real-time topology map.

According to an embodiment of the present disclosure, as shown in FIG. 2, the electronic device 200 may further include a topology map generation unit 250. The topology map generation unit 250 is configured to generate the real-time topology map.

According to an embodiment of the present disclosure, the topology map generation unit 250 may determine real-time positions of the vehicles in the predetermined range based on position information, speed information and driving route information of the vehicles, and then generate the real-time topology map based on the real-time positions of the vehicles. That is, according to an embodiment of the present disclosure, the device generating the real-time topology map may be an electronic device 200, which may be an RSU or an electronic device for a vehicle.

According to an embodiment of the present disclosure, the electronic device 200 may receive vehicle state information from the vehicles in the predetermined range to generate the real-time topology map. The vehicle state information includes, but is not limited to, position information, speed information and driving route information of the vehicles. The predetermined range may be a range in which the electronic device 200 receives messages. The electronic device 200 may periodically receive the vehicle state information from the vehicles in the predetermined range. The content of the real-time topology map generated by the electronic device 200 may be similar to the content of the real-time topology map received from the RSU, which is not repeated herein.

As described above, according to the embodiments of the present disclosure, the real-time topology map may be generated by a vehicle or an RSU wanting to send information, thereby reducing interaction with the RSU and further saving signaling.

It should be noted that the information of the vehicle nodes in the real-time topology map may be information of the vehicle nodes relative to the electronic device 200, so that the real-time topology map is relative to the electronic device 200. That is, real-time topology maps generated by the RSU for different vehicles may be different, and real-time topology maps generated by different vehicles may be different.

According to an embodiment of the present disclosure, after the electronic device 200 generates or obtains a real-time topology map, the determination unit 210 may determine the one or more relay vehicles based on the real-time topology map. Hereinafter, this process is to be described in detail.

According to an embodiment of the present disclosure, the determination unit 210 may determine a propagation path of the message. The electronic device 200 may be a source node of the message. That is, the electronic device 200 wants to send the vehicle-related message. According to an embodiment of the present disclosure, the propagation path of the message may be along a direction of a road where the electronic device 200 is located. In addition, the propagation path of the message may be along a direction of a road, or may be along a direction of a road and then long a direction of another road. For example, the electronic device 200 may determine a path along a direction of a current road and towards a rear of the electronic device 200 (that is, a direction of a rear of the vehicle) as a propagation path of the message. For another example, the electronic device 200 may determine a path along a direction of a current road and towards a rear of the electronic device 200 as a first segment of a propagation path of the message, and determine a path towards another road after reaching a next intersection as a second segment of the propagation path of the message.

Figure 3:
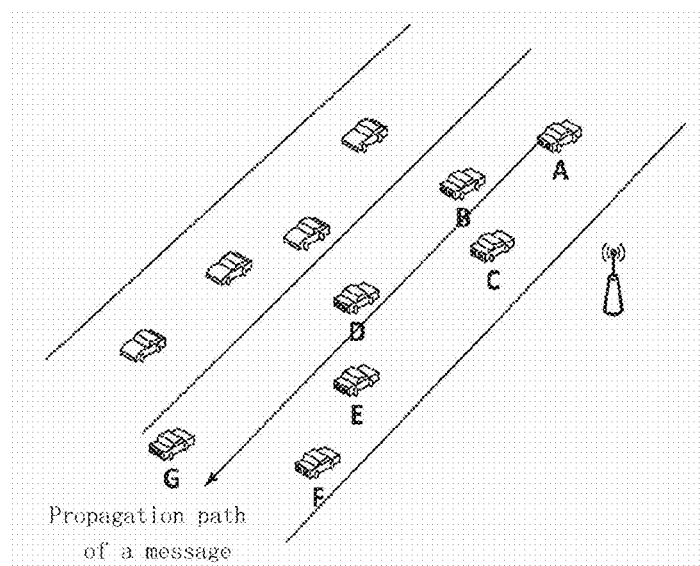
FIG. 3 is a schematic diagram showing real-time positions of vehicles on a propagation path of a message according to an embodiment of the present disclosure.

FIG. 3 is a schematic diagram showing real-time positions of vehicles on a propagation path of a message according to an embodiment of the present disclosure. As shown in FIG. 3, there are vehicles A to F on a road on the right. At this time, it is assumed that vehicle A finds that there is a collision or road congestion ahead, and vehicle A wants to send collision warning information or congestion information to remind the vehicles behind, then vehicle A may determine a path, along a direction of the current road and towards the rear of vehicle A, as a propagation path of the message. In the above process, vehicle A serves as a source node for message propagation, and vehicle A may include the electronic device 200 mentioned above.

According to an embodiment of the present disclosure, the determination unit 210 may project vehicles in the real-time topology map onto the propagation path of the message to generate a projection topology map.

Figure 4:
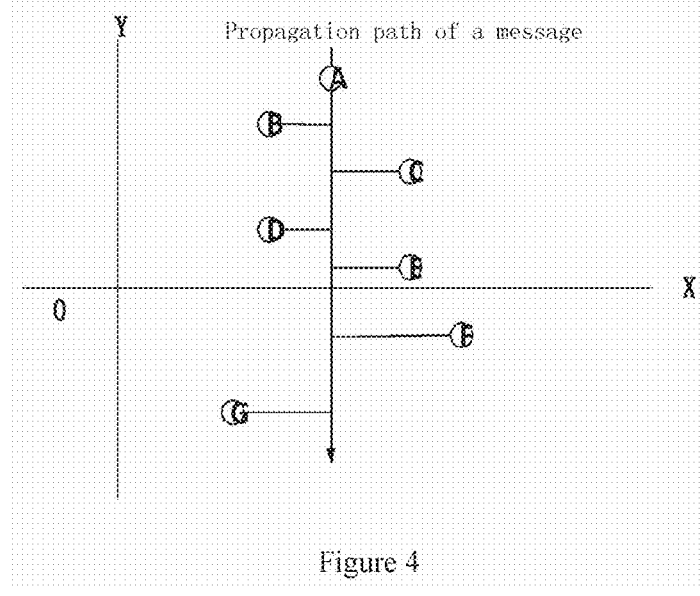
FIG. 4 is a schematic diagram showing a real-time topology map according to an embodiment of the present disclosure.

FIG. 4 is a schematic diagram showing a real-time topology map according to an embodiment of the present disclosure. As shown in FIG. 4, in the real-time topology map, each of nodes represents a vehicle, and each of vehicles is arranged on a real-time position of the vehicle.

Figure 5:
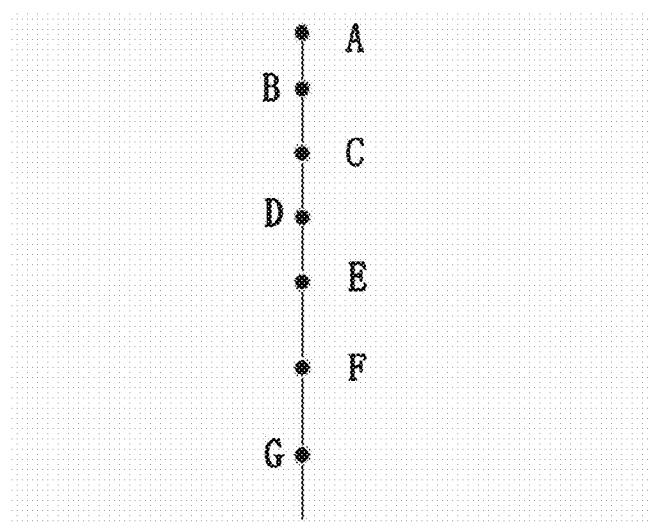
FIG. 5 is a schematic diagram showing a projection topology map according to an embodiment of the present disclosure.

FIG. 5 is a schematic diagram showing a projection topology map according to an embodiment of the present disclosure. As shown in FIG. 5, vehicles A to F are projected along a propagation direction of the message to form seven nodes along the propagation direction of the message.

According to an embodiment of the present disclosure, the determination unit 210 may determine the one or more relay vehicles based on positions of vehicles in the projection topology map.

According to an embodiment of the present disclosure, as described above, the real-time topology map may further include communication quality information of the vehicles. The communication quality information includes link loss information and/or signal to interference plus noise ratio information. The determination unit 210 may determine the one or more relay vehicles based on the communication quality information of the vehicles and the positions of the vehicle in the projection topology map.

According to an embodiment of the present disclosure, the determination unit 210 may determine the one or more relay vehicles using a clustering method. For example, the determination unit 210 may cluster the vehicles into classes based on the communication quality information and determine a center of each of the classes. Then, the determination unit 210 may determine, for each pair of adjacent centers, a midpoint of a line between the pair of adjacent centers, and determines a vehicle, closest to the midpoint of each pair of the adjacent centers, as the one or more relay vehicles.

For example, in the example shown in FIG. 5, the determination unit 210 may cluster, based on a path loss and/or an SINR of each of nodes, nodes A, B and C into a first class and nodes D, E, F and G into a second class. The determination unit 210 determines a center point of the first class and a center point of the second class. Then, the determination unit 210 connects the center point of the first class and the center point of the second class to obtain a line segment, and determines a midpoint of the line segment between the two center points. And then the determination unit 210 may determine a node closest to the midpoint, such as node D, as a first relay vehicle node. That is, it is required for node D to forward the message received from node A. As described above for the example of determining the first relay vehicle node, the determination unit 210 may sequentially determine other relay vehicle nodes in a similar manner.

As described above, according to the embodiments of the present disclosure, the real-time positions of the vehicle nodes may be projected onto the propagation path of the message to determine a relay vehicle based on the projection topology map. According to the conventional method, it is required to calculate communication quality between every two vehicles to select a relay vehicle. That is, it is required to perform information interaction between N vehicle nodes, resulting in a complexity of $O(N^2)$. Compared with the conventional method, according to the embodiments of the present disclosure, the complexity is $O(N)$ which is greatly reduced, effectively reducing the calculation amount for calculating a relay vehicle node.

According to an embodiment of the present disclosure, the relay vehicle node represents a vehicle node required to forward the vehicle-related information sent by the electronic device 200. The vehicle-related message may include a basic safety message, a road side unit message, and a road side safety message.

According to an embodiment of the present disclosure, pseudo codes of the basic safety message are shown as follows.

```
BasicSafety Message ::= SEQUENCE {
        msgCnt MsgCount,
        id OCTET STRING (SIZE(8)),
        --vehicle ID,
        plateNo OCTET STRING (SIZE(4..16)) OPTIONAL,
        --Reserved for Electronic Vehicle Identification
        brn BroadcastRelayNode OPTIONAL,
        secMark DSecond,
pos Position3D,
        accuracy PositionConfidenceSet,
        transmission TransmissionState,
        speed Speed,
        heading Heading,
        angle SteeringWheelAngle OPTIONAL,
        motionCfd MotionConfidenceSet OPTIONAL,
        accelSet AccelerationSet4Way,
```

```
            brakes BrakeSyetemStatus,
            size VehicleSize,
            vehicelClass VehicleClassification,
            --VehicleClassification includes Basic VehicleClass and
other
extendible type
            safetyExt VehicleSafetyExtensions OPTIONAL
            ...
    }
```

In the pseudo codes, BasicSafetyMessage represents the basic safety message, brn represents a relay vehicle information element, and BroadcastRelayNode represents information of a relay vehicle.

According to an embodiment of the present disclosure, pseudo codes of the road side unit message are shown as follows.

```
    RoadSideInformation ::= SEQUENCE {
                msgCnt MsgCount,
                timeStamp MinuteOfTheYear OPTIONAL,
                id OCTET STRING (SIZE(8)),
                --RSU ID
                rsiId INTEGER (0..255),
                --local ID of this rsi information set by RSU
                alertType AlertType,
                brn BroadcastRelayNode OPTIONAL,
                --Text message warning or Traffic sign type according to
China GB5768
                description IA5String (SIZE(1..256)) OPTIONAL,
                --Text message if alertType=0
                --Additional description to the traffic sign if alertType > 0
                --e.g. describe the subtype of the traffic sign
                priority Priority OPTIONAL,
                --the urgency of this message, a relative
                --degree of merit compared with other
                --similar message for this type (not other message being sent
by the device), nor a priority of display urgency
                refPos Position3D,
                --Position of traffic alert (traffic sign or incident)
                alertPath PathPointList,
                --Warning is active if vehicle is within this path
                --Points are listed from upstream to downstrean
                --along the vehicle drive direction.
                --One path includes at least two points.
                alertRadius Radius,
                --The biggest distance away from the alert path
                --within which the warning is active.
                ...
        }
```

In the pseudo codes, RoadSideInformation represents the road side unit message, bin represents a relay vehicle information element, and BroadcastRelayNode represents information of a relay vehicle.

According to an embodiment of the present disclosure, pseudo codes of the road side safety message are shown as follows.

```
        RoadsideSafetyMessage ::= SEQUENCE {
            msgCnt MsgCount,
                        id OCTET STRING (SIZE(8)),
                        --RSU ID
                        refPos Positon3D,
                        brn BroadcastRelay Node OPTIONAL,
                        --Reference position of this RSM message
                        participants ParticipantList,
                        --All or part of the participants detected by RSU
                        ...
            }
```

In the pseudo codes, RoadsideSafetyMessage represents the road side safety message, brn represents a relay vehicle information element, and BroadcastRelayNode represents information of a relay vehicle.

According to an embodiment of the present disclosure, there may be one or more relay vehicle nodes. Therefore, information of one or more relay vehicles may be represented by a list of relay vehicle information. Pseudo codes of the list of the relay vehicle information are shown as follows.

BroadcastRelayNodeList::=SEQUENCE (SIZE(1 . . . 32)) OF DF_BroadcastRelayNode

In the pseudo codes, BroadcastRelayNodeList represents the list of relay vehicle information, which may include information of 32 relay vehicles at most, and BroadcastRelayNode represents information of each of the relay vehicles.

According to an embodiment of the present disclosure, the information of each of the relay vehicles may include: identification information of the relay vehicle, position information of the relay vehicle, and/or message transmission range information of the relay vehicle.

According to an embodiment of the present disclosure, pseudo codes of information of each of the relay vehicles are shown as follows.

```
            BroadcastRelayNode ::= SEQUENCE {
                modelD RelayNodeID,
                lat Latitude,
                long Longitude,
                covRadius CoverageRadius,
                ...
            }
```

In the pseudo codes, BroadcastRelayNode represents the information of each of the relay vehicles, modeID represents a relay vehicle ID element, RelayNodeID represents an ID of a relay vehicle, lat represents a latitude information element of the relay vehicle, Latitude represents latitude information of the relay vehicle, long represents a longitude information element of the relay vehicle, Longitude represents longitude information of the relay vehicle, covRadius represents a coverage radius element of the relay vehicle, and CoverageRadius represents a coverage radius of the relay vehicle.

According to an embodiment of the present disclosure, pseudo codes of the ID of the relay vehicle are shown as follows.

RelayNodeID::=INTEGER (0 . . . 65535)

In the pseudo codes, RelayNodeID represents the ID of the relay vehicle, which is an integer ranging from 0 to 65535.

According to an embodiment of the present disclosure, pseudo codes of the latitude of the relay vehicle are shown as follows.

Latitude::=INTEGER (−900000000 . . . 900000001)

In the pseudo codes, Latitude represents the latitude of the relay vehicle, which is an integer ranging from −900000000 to 900000001.

According to an embodiment of the present disclosure, pseudo codes of the longitude of the relay vehicle are shown as follows.

Longitude::=INTEGER (−1799999999 . . . 1800000001)

In the pseudo codes, Longitude represents the longitude of the relay vehicle, which is an integer ranging from −1799999999 to 1800000001.

According to an embodiment of the present disclosure, pseudo codes of the coverage radius of the relay vehicle are shown as follows.

CoverageRadius::=INTEGER (0 . . . 65535)
—unit is 0.1 m

In the pseudo codes, CoverageRadius represents the coverage radius of the relay vehicle, which is an integer ranging from 0 to 65535 and with a step size of 0.1 m.

As described above, according to the embodiments of the present disclosure, information of one or more relay vehicles may be included in the vehicle-related information to be sent by the electronic device 200, and the electronic device 200 may send the vehicle-related information by broadcasting. That is, the electronic device 200 may determine a relay vehicle required to forward the information, so that vehicles other than the relay vehicle do not forward received information, thereby reducing the redundancy of information transmission, saving signaling overhead and reducing interference. In addition, since information of the relay vehicles may be in the form of a list which may include multiple relay nodes, multi-hop transmission of messages can be realized, thereby expanding coverage of messages.

Figure 6:
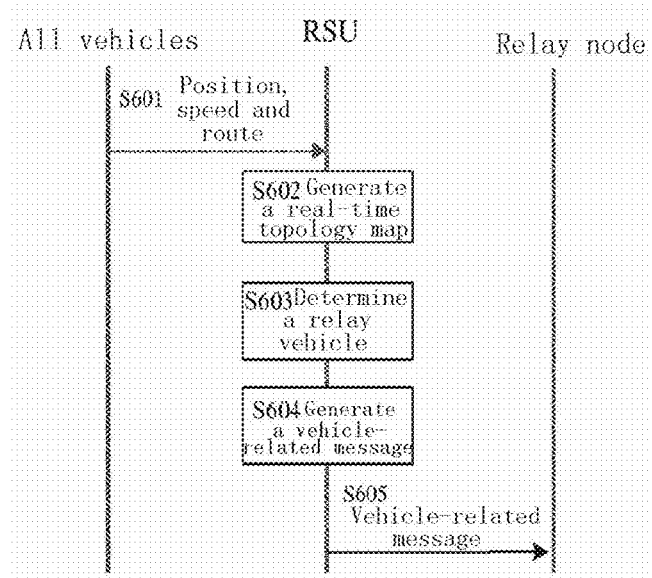
FIG. 6 is a signaling flowchart of sending a vehicle-related message based on a real-time topology map according to an embodiment of the present disclosure.

FIG. 6 is a signaling flowchart of sending a vehicle-related message based on a real-time topology map according to an embodiment of the present disclosure. In FIG. 6, an RSU may be implemented by an electronic device 200. As shown in FIG. 6, in step S601, all vehicles around the RSU send vehicle state information to the RSU, where the vehicle state information includes, but is not limited to, position information, speed information and driving route information. In step S602, the RSU generates a real-time topology map for the RSU based on the vehicle state information of all the vehicles. In step S603, the RSU determines a relay vehicle required to forward a message based on the real-time topology map. In step S604, the RSU generates a vehicle-related message, which includes information of the relay vehicle. In step S605, the RSU broadcasts the vehicle-related message, and the relay vehicle forwards the message. As described above, the device wanting to send information is the RSU, and the RSU may determine the relay vehicle based on the generated real-time topology map.

Figure 7:
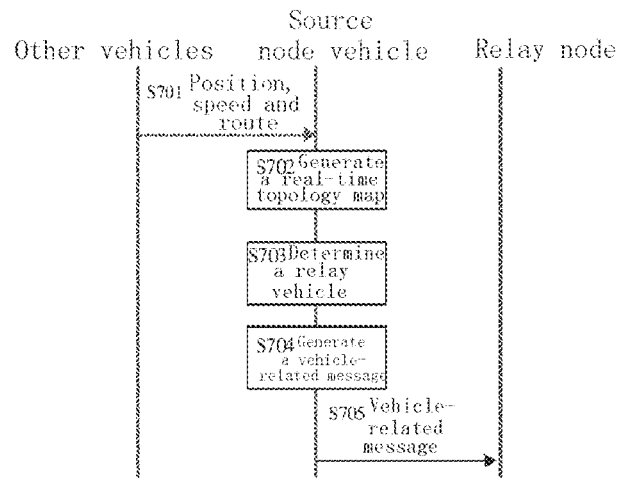
FIG. 7 is a signaling flowchart of sending a vehicle-related message based on a real-time topology map according to an embodiment of the present disclosure.

FIG. 7 is a signaling flowchart of sending a vehicle-related message based on a real-time topology map according to an embodiment of the present disclosure. In FIG. 7, a source node vehicle may be implemented by an electronic device 200. As shown in FIG. 7, in step S701, all vehicles around the source node vehicle send vehicle state information to the source node vehicle, where the vehicle state information includes, but is not limited to, position information, speed information and driving route information. Then, in step S702, the source node vehicle generates a real-time topology map for the source node vehicle based on the vehicle state information of all the vehicles. In step S703, the source node vehicle determines a relay vehicle required to forward a message based on the real-time topology map. In step S704, the source node vehicle generates a vehicle-related message, which includes information of the relay vehicle. In step S705, the source node vehicle broadcasts the vehicle-related message, and the relay vehicle forwards the message. As described above, the device wanting to send information is the source node vehicle, and the source node vehicle may determine the relay vehicle based on the generated real-time topology map.

Figure 8:
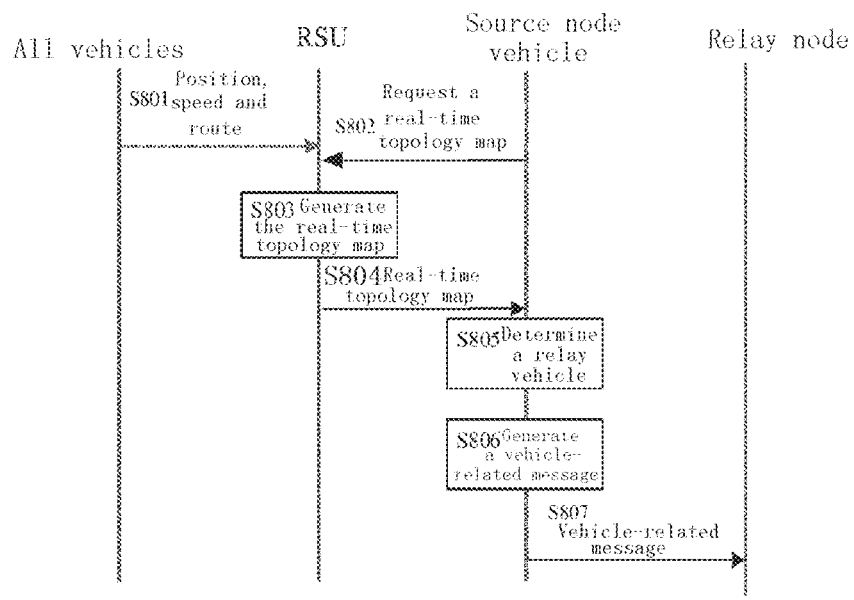
FIG. 8 is a signaling flowchart of sending a vehicle-related message based on a real-time topology map according to an embodiment of the present disclosure.

FIG. 8 is a signaling flowchart of sending a vehicle-related message based on a real-time topology map according to an embodiment of the present disclosure. In FIG. 8, a source node vehicle may be implemented by an electronic device 200. As shown in FIG. 8, in step S801, all vehicles around an RSU send vehicle state information to the RSU, where the vehicle state information includes, but is not limited to, position information, speed information and driving route information. In step S802, the source node vehicle sends request information to the RSU for requesting a real-time topology map. In step S803, the RSU generates a real-time topology map for the source node vehicle based on the vehicle state information of all the vehicles. In step S804, the RSU sends the real-time topology map to the source node vehicle. In step S805, the source node vehicle determines a relay vehicle required to forward a message based on the real-time topology map. In step S806, the source node vehicle generates a vehicle-related message, which includes information of the relay vehicle. In step S807, the source node vehicle broadcasts the vehicle-related message, and the relay vehicle forwards the message. As described above, the device wanting to send information is the source node vehicle, and the source node vehicle may determine the relay vehicle based on the real-time topology map from the RSU.

As described above, according to the embodiments of the present disclosure, in a case that an electronic device 200 is arranged in a vehicle, the electronic device 200 may generate a real-time topology map and determine a relay vehicle based on the generated real-time topology map, or the electronic device 200 may request a real-time topology map from an RSU and determine a relay vehicle based on a received real-time topology map. In a case that an electronic device 200 is arranged in an RSU, the electronic device 200 may generate a real-time topology map and determine a relay vehicle based on the generated real-time topology map. In both the cases, information of one or more relay vehicles may be included in the vehicle-related information to be sent by the electronic device 200, so that vehicles other than the relay vehicle do not forward received information, thereby reducing the redundancy of information sending, saving signaling overhead and reducing interference. In addition, since information of the relay vehicles may be in the form of a list which may include multiple relay nodes, multi-hop transmission of messages can be realized, thereby expanding coverage of messages.

As described above, according to the embodiments of the present disclosure, information of the real-time topology map may be added to the map message, and information of relay vehicles may be respectively added to the basic safety message, the road side unit message, and the road side safety message. In summary, according to the embodiments of the present disclosure, a message transmission process in the Internet of Vehicles can be optimized.

<3. Configuration Examples of an Electronic Device Receiving Information>

Figure 9:
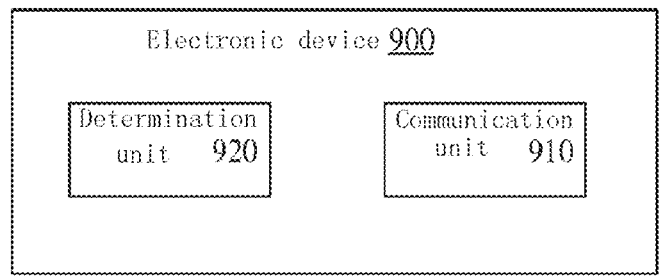
FIG. 9 is a block diagram showing a configuration example of an electronic device for receiving information according to an embodiment of the present disclosure.

FIG. 9 is a block diagram showing a structure of an electronic device 900 for receiving information in a wireless communication system according to an embodiment of the present disclosure. The electronic device 900 may be used for a vehicle.

As shown in FIG. 9, the electronic device 900 may include a communication unit 910 and a determination unit 920.

All the units of the electronic device 900 may be included in processing circuitry, it should be noted that the electronic device 900 may include one processing circuitry or multiple processing circuitry. Furthermore, the processing circuitry may include various discrete functional units to perform various functions and/or operations. It should be noted that these functional units may be physical entities or logical entities, and units with different titles may be implemented by the same physical entity.

According to an embodiment of the present disclosure, the electronic device 900 may receive a vehicle-related message through the communication unit 910. The message includes information about one or more relay vehicles required to forward the message. The electronic device 900 may receive a broadcasted message which may be sent by an RSU or by another vehicle.

According to an embodiment of the present disclosure, the determination unit 920 may determine whether the information of the one or more relay vehicles includes the electronic device 900. For example, the determination unit 920 may determine whether the electronic device 900 is a relay vehicle by determining whether identification information of the relay vehicles included in the received message includes an identification of the electronic device 900.

According to an embodiment of the present disclosure, in a case that the determination unit 920 determines that the information of the one or more relay vehicles includes the electronic device 900, the electronic device 900 may forward the message through the communication unit 910. For example, the electronic device 900 may forward the message by broadcasting.

According to an embodiment of the present disclosure, in a case that the determination unit 920 determines that the information of the one or more relay vehicles does not include the electronic device 900, the electronic device 900 may not forward the message, that is, may discard the message.

According to an embodiment of the present disclosure, the information of the one or more relay vehicles received by the electronic device 900 may further include at least one of the following information: identification information of each of the relay vehicles, position information of each of the relay vehicles, and message transmission range information of each of the relay vehicles.

According to an embodiment of the present disclosure, the vehicle-related message received by the electronic device 900 includes, but is not limited to, a basic safety message, a road side unit message, and a road side safety message.

As described above, according to the embodiments of the present disclosure, only in a case that the information of the relay vehicles in the vehicle-related message includes the electronic device 900, the electronic device 900 forwards the message; and in a case that the information of the relay vehicles in the vehicle-related message does not include the electronic device 900, the electronic device 900 discards the message. Therefore, the redundancy of information transmission can be reduced, signaling overhead can be saved, and interference can be reduced.

<4. Method Embodiments>

Hereinafter, a wireless communication method performed by an electronic device 200 in a wireless communication system according to an embodiment of the present disclosure is described in detail.

Figure 10:
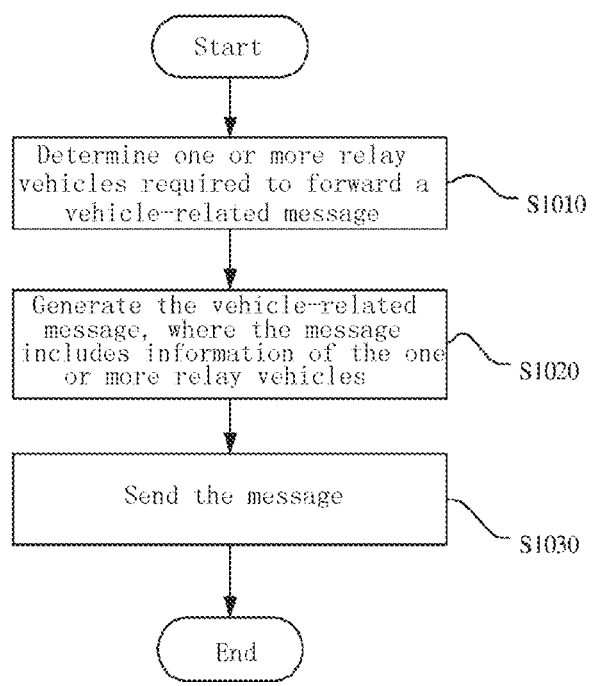
FIG. 10 is a flowchart of a wireless communication method performed by an electronic device according to an embodiment of the present disclosure.

FIG. 10 is a flowchart showing a wireless communication method performed by an electronic device 200 in a wireless communication system according to an embodiment of the present disclosure.

As shown in FIG. 10, in step S1010, one or more relay vehicles required to forward a vehicle-related message are determined.

In step S1020, the vehicle-related message is generated. The message includes information of the one or more relay vehicles.

In step S1030, the message is sent.

Preferably, the one or more relay vehicles are determined by: determining the one or more relay vehicles based on a real-time topology map in a predetermined range. The real-time topology map includes real-time position information of all vehicles in the predetermined range.

Preferably, the wireless communication method further includes: sending request information to a road side unit for requesting the real-time topology map; and receiving the real-time topology map from the road side unit.

Preferably, the receiving the real-time topology map includes: receiving the real-time topology map using a map message.

Preferably, the wireless communication method further includes: determining, based on position information, speed information and driving route information of the vehicles in the predetermined range, real-time positions of the vehicles; and generating the real-time topology map based on the real-time positions of the vehicles.

Preferably, the determining the one or more relay vehicles includes: determining a propagation path of the message; projecting vehicles in the real-time topology map onto the propagation path of the message to generate a projection topology map; and determining the one or more relay vehicles based on positions of vehicles in the projection topology map.

Preferably, the real-time topology map further includes communication quality information of all the vehicles in the predetermined range. The determining the one or more relay vehicles includes: determining the one or more relay vehicles based on the communication quality information of the vehicles in the predetermined range.

Preferably, the determining the one or more relay vehicles includes: clustering the vehicles in the predetermined range into classes based on the communication quality information; determining a center of each of the classes; determining, for each pair of adjacent centers, a midpoint of a line between the pair of adjacent centers; and determining a vehicle; closest to the midpoint of each pair of the adjacent centers, as the one or more relay vehicles.

Preferably, the communication quality information includes link loss information and/or signal to interference plus noise ratio information.

Preferably, the information about the one or more relay vehicles includes at least one of the following information: identification information of each of the relay vehicles, position information of each of the relay vehicles, and message transmission range information of each of the relay vehicles.

Preferably, the vehicle-related message includes a basic safety message, a road side unit message, and a road side safety message.

Preferably, the electronic device 200 is a road side unit or a vehicle.

According to the embodiment of the present disclosure, the subject that performs the method may be the electronic device 200 according to the embodiments of the present disclosure, so all the embodiments of the electronic device 200 are applicable herein.

Hereinafter, a wireless communication method performed by an electronic device 900 in a wireless communication system according to an embodiment of the present disclosure is described in detail.

Figure 11:
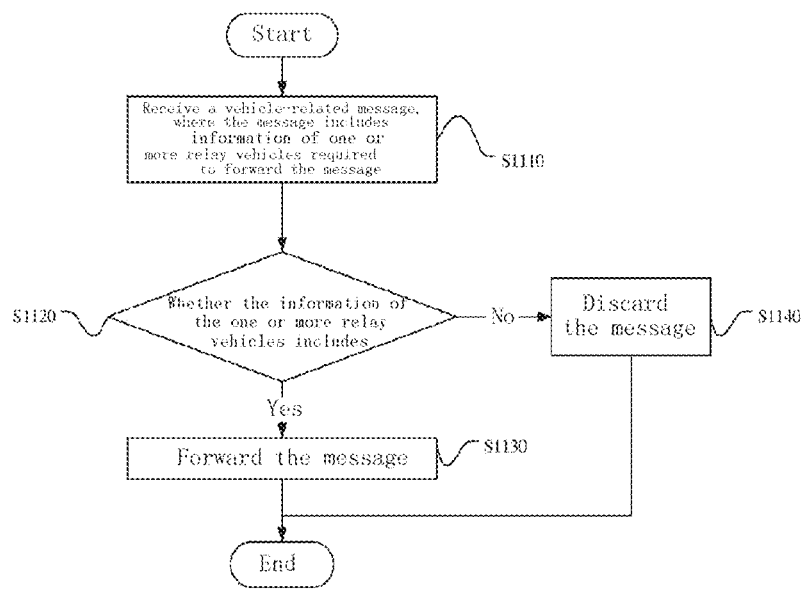
FIG. 11 is a flowchart of a wireless communication method performed by an electronic device according to another embodiment of the present disclosure.

FIG. 11 is a flowchart showing a wireless communication method performed by an electronic device 900 in a wireless communication system according to an embodiment of the present disclosure.

As shown in FIG. 11, in step S1110, a vehicle-related message is received. The message includes information of one or more relay vehicles required to forward the message.

In step S1120, it is determined whether the information of the one or more relay vehicles includes information of the electronic device 900.

In step S1130, in a case that the information of the one or more relay vehicles includes the electronic device 900, the message is forwarded.

In step S1140, in a case that the information of the one or more relay vehicles does not include the electronic device 900, the message is discarded.

Preferably, the information of the one or more relay vehicles includes at least one of the following information: identification information of each of the relay vehicles, position information of each of the relay vehicles, and message transmission range information of each of the relay vehicles.

Preferably, the vehicle-related message includes a basic safety message, a road side unit message, and a road side safety message.

Preferably, the electronic device 900 is a vehicle.

According to the embodiment of the present disclosure, the subject that performs the method may be the electronic device 900 according to the embodiments of the present disclosure, so all the embodiments of the electronic device 900 are applicable herein.

<5. Application Examples>

The embodiments of the present disclosure may be applied to various scenarios.

Figure 12:
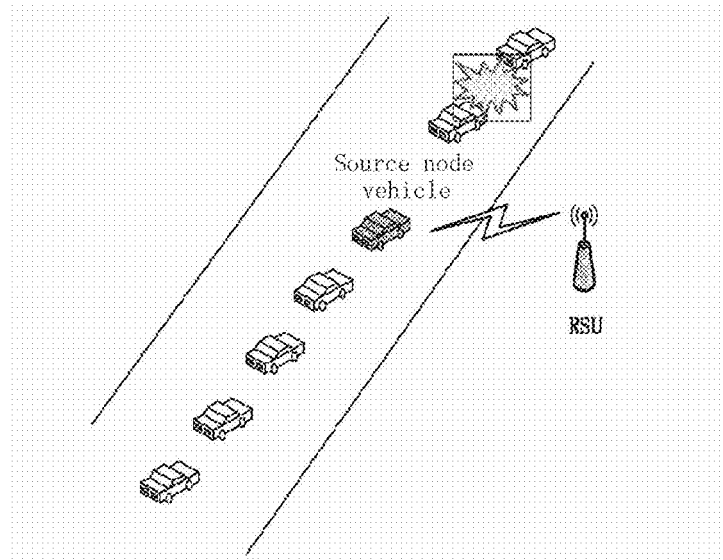
FIG. 12 is a schematic diagram showing a vehicle collision scenario according to an embodiment of the present disclosure.

FIG. 12 is a schematic diagram showing a vehicle collision scenario according to an embodiment of the present disclosure. As shown in FIG. 12, a source node vehicle finds that there is a vehicle collision ahead, so that the source node vehicle wants to send a vehicle collision warning message to warn the vehicles behind.

Figure 13:
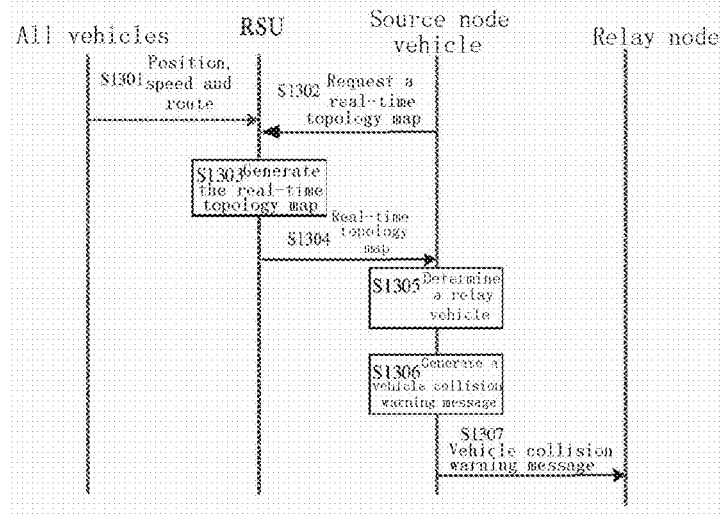
FIG. 13 is a signaling flowchart of sending a vehicle collision warning message in the scenario shown in FIG. 12.

FIG. 13 is a signaling flowchart of sending a vehicle collision warning message in the scenario shown in FIG. 12. As shown in FIG. 13, in step S1301, all vehicles around an RSU send vehicle state information to the RSU, where the vehicle state information includes, but is not limited to, position information, speed information and driving route information. In step S1302, after the source node vehicle finds that there is a vehicle collision ahead, the source node vehicle sends request information to the RSU for requesting a real-time topology map. In step S1303, the RSU generates a real-time topology map for the source node vehicle. In step S1304, the RSU sends the generated real-time topology map to the source node vehicle. In step S1305, the source node vehicle determines a relay vehicle based on the real-time topology map. In step S1306, the source node vehicle generates a vehicle collision warning message, which includes information about the relay vehicle. In step S1307, the source node vehicle broadcasts the vehicle collision warning message, and the relay vehicle, having received the message, forwards the message. As described above, in the vehicle collision scenario, the source node vehicle may acquire the real-time topology map through communication with an RSU near the source node vehicle, determine an appropriate relay vehicle required to forward the message, and send the vehicle collision warning message to remind the vehicles behind.

Figure 14:
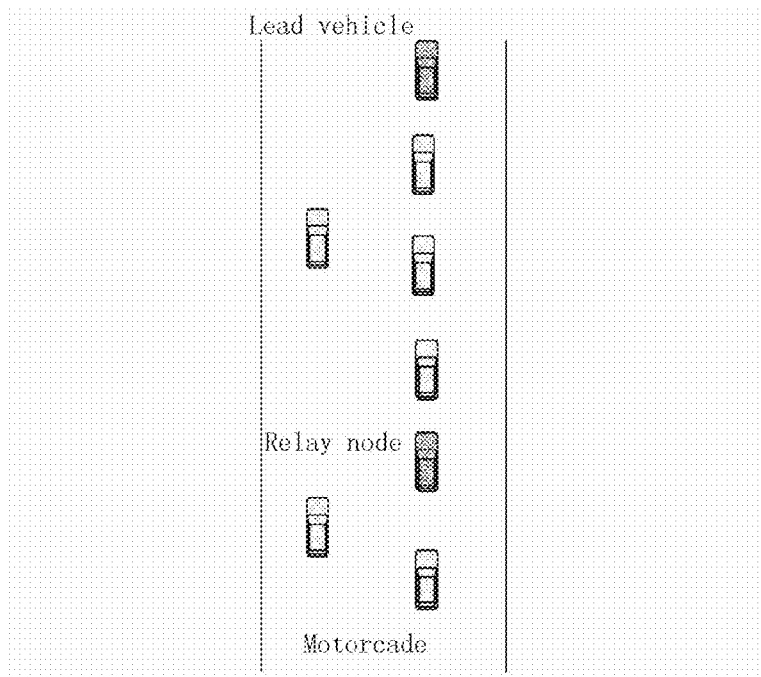
FIG. 14 is a schematic diagram showing a motorcade driving scenario according to an embodiment of the present disclosure.

FIG. 14 is a schematic diagram showing a motorcade driving scenario according to an embodiment of the present disclosure. As shown in FIG. 14, six vehicles are driving on the road in a motorcade, with a front vehicle being a lead vehicle and the remaining vehicles being member vehicles. In this scenario, the lead vehicle may need to send a group management message, including such as forward road condition information or route planning information, to the member vehicles.

Figure 15:
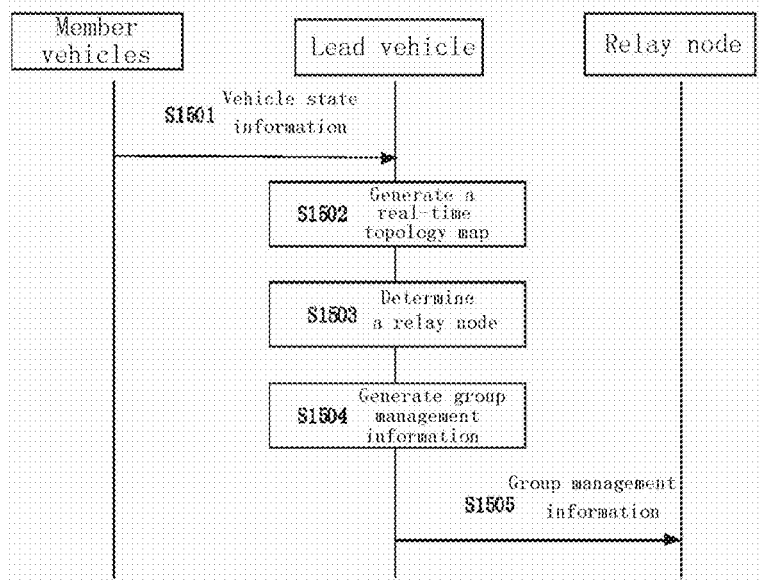
FIG. 15 is a signaling flowchart of sending group management information in the scenario shown in FIG. 14.

FIG. 15 is a signaling flowchart of sending group management information in the scenario shown in FIG. 14. As shown in FIG. 15, in step S1501, the member vehicles send vehicle state information to the lead vehicle, where the vehicle state information includes, but is not limited to, position information, speed information and driving route information. In step S1502, the lead vehicle generates a real-time topology map for the lead vehicle. In step S1503, the lead vehicle determines a relay node based on the real-time topology map. In step S1504, the lead vehicle generates group management information, which includes information of the relay vehicle. In step S1505, the lead vehicle broadcasts the group management information, and the relay vehicle, having received the information, forwards the information. As described above, according to the embodiments of the present disclosure, the lead vehicle in the motorcade may generate the real-time topology map and determine the relay device, expanding the transmission range of the group management message and reducing the redundancy of the message.

Figure 16:
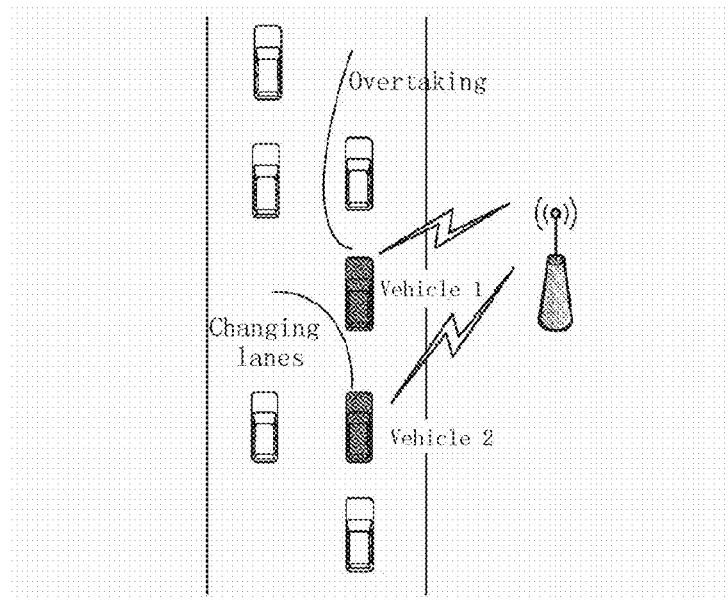
FIG. 16 is a schematic diagram showing a scenario in which a vehicle overtakes and changes lanes according to an embodiment of the present disclosure.

FIG. 16 is a schematic diagram showing a scenario in which a vehicle overtakes and changes lanes according to an embodiment of the present disclosure. As shown in FIG. 16, vehicle 1 is driving on a right lane on a road, and vehicle 1 wants to overtake a preceding vehicle. Vehicle 2 is driving behind vehicle 1, and vehicle 2 wants to change lanes to a left lane on the road.

Figure 17:
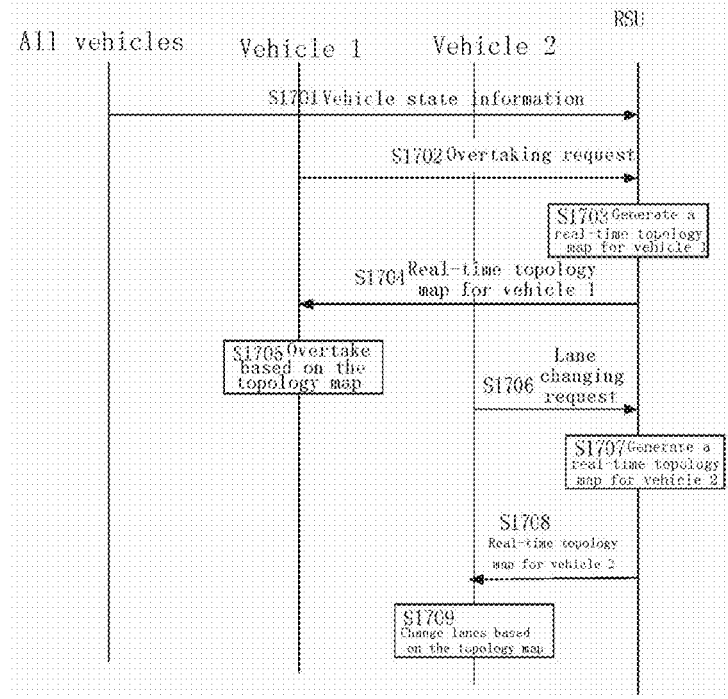
FIG. 17 is a signaling flowchart of sending a real-time topology map in the scenario shown in FIG. 16.

FIG. 17 is a signaling flowchart of sending a real-time topology map in the scenario shown in FIG. 16. As shown in FIG. 17, in step S1701, all vehicles around an RSU send vehicle state information to the RSU, where the vehicle state information includes, but is not limited to, speed information, position information and driving route information. In step S1702, vehicle 1 sends overtaking request information to the RSU. In step S1703, the RSU generates a real-time topology map for vehicle 1. In step S1704, the RSU sends the real-time topology map for vehicle 1 to vehicle 1. In step S1705, vehicle 1 may perform overtaking based on the real-time topology map. In step S1706, vehicle 2 sends lane changing request information to the RSU. In step S1707, the RSU generates a real-time topology map for vehicle 2. In step S1708, the RSU sends the real-time topology map for vehicle 2 to vehicle 2. In step S1709, vehicle 2 may change lanes based on the real-time topology map. As described above, according to the embodiments of the present disclosure, vehicle 1 can perform overtaking accurately and safely based on the real-time topology map, and vehicle 2 can change lanes accurately and safely based on the real-time topology map, thereby improving the safety of vehicle driving.

Figure 18:
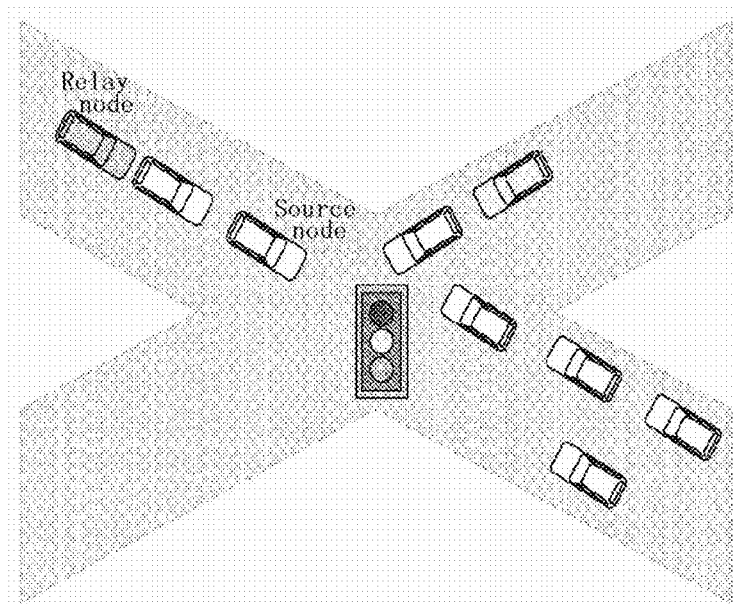
FIG. 18 is a schematic diagram showing a traffic congestion scenario according to an embodiment of the present disclosure.

FIG. 18 is a schematic diagram showing a traffic congestion scenario according to an embodiment of the present disclosure. As shown in FIG. 18, traffic congestion occurs at an intersection. A source node vehicle at the intersection finds the traffic congestion and wants to send a vehicle congestion warning message to the vehicles behind the source node vehicle to remind these vehicles.

Figure 19:
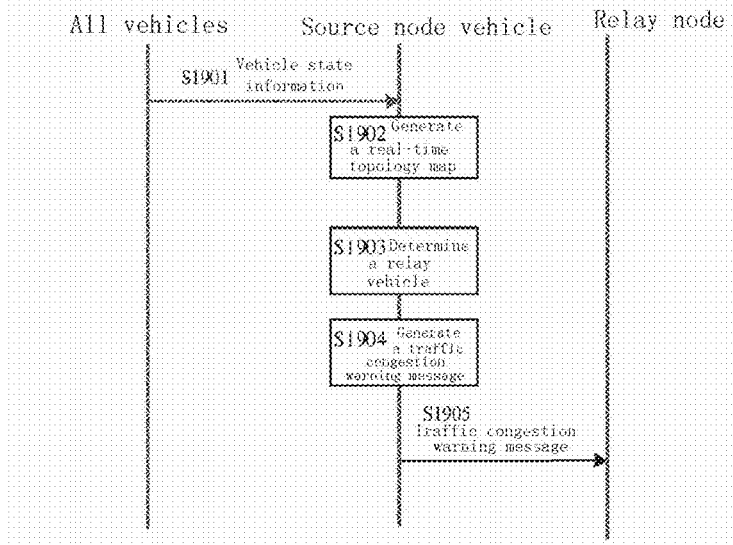
FIG. 19 is a signaling flowchart of sending a traffic congestion warning message in the scenario shown in FIG. 18.

FIG. 19 is a signaling flowchart of sending a traffic congestion warning message in the scenario shown in FIG. 18. As shown in FIG. 19, in step S1901, all vehicles around the source node vehicle send vehicle state information to the source node vehicle, where the vehicle state information includes, but is not limited to, position information, speed information and driving route information. In step S1902, the source node vehicle generates a real-time topology map for the source node vehicle. In step S1903, the source node vehicle determines a relay vehicle required to forward a message based on the real-time topology map. In step S1904, the source node vehicle generates a traffic congestion warning message, which includes information of the relay vehicle. In step S1905, the source node vehicle broadcasts the traffic congestion warning message, and the relay vehicle, having received the message, forwards the message. As described above, according to the embodiments of the present disclosure, after the source node vehicle finds the traffic congestion, the source node vehicle may generate the real-time topology map and determine the relay device, so that the traffic congestion warning message may be sent to the vehicles behind the source node vehicle to notify these vehicles to change a route in time.

Figure 20:
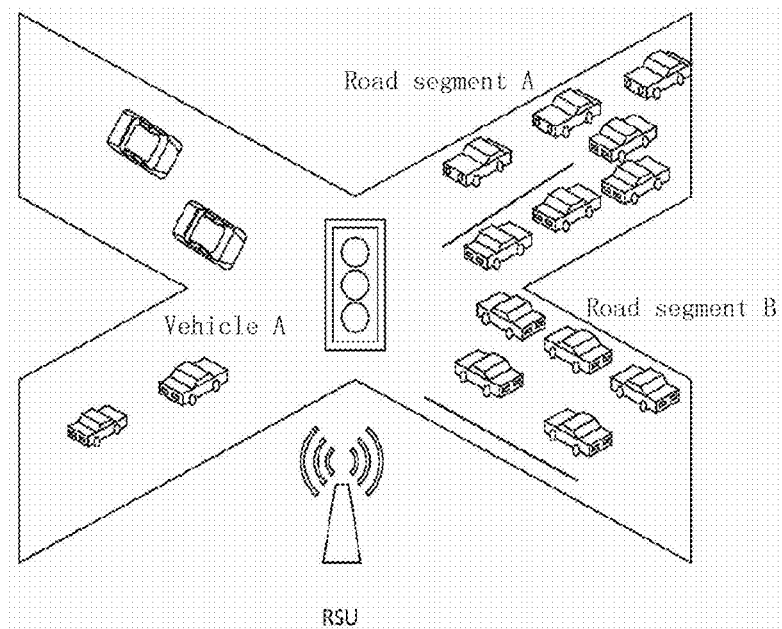
FIG. 20 is a schematic diagram showing a road segment selection scenario according to an embodiment of the present disclosure.

FIG. 20 is a schematic diagram showing a road segment selection scenario according to an embodiment of the present disclosure. As shown in FIG. 20, when vehicle A reaches an intersection, vehicle A may go straight or turn right, that is, vehicle A may select a road segment A or a road segment B to drive to reach a destination.

Figure 21:
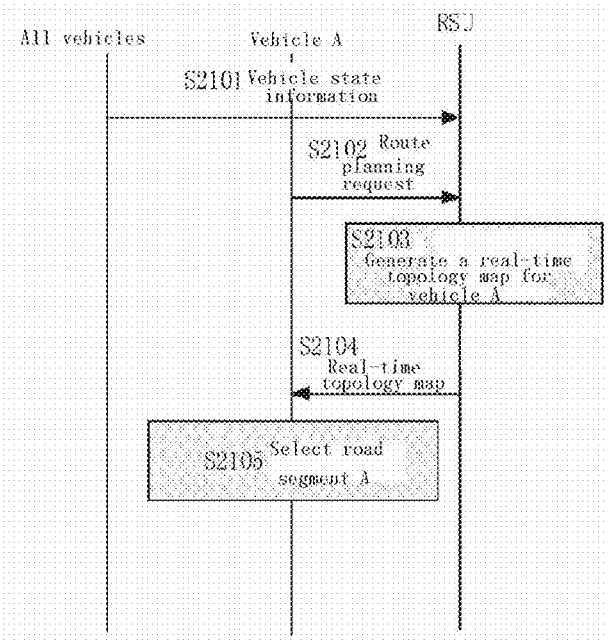
FIG. 21 is a signaling flowchart of sending a real-time topology map in the scenario shown in FIG. 20.

FIG. 21 is a signaling flowchart of sending a real-time topology map in the scenario shown in FIG. 20. As shown in FIG. 21, in step S2101, all vehicles around an RSU send vehicle state information to the RSU, where the vehicle state information includes, but is not limited to, position information, speed information and driving route information. In step S2102, in a case that vehicle A wants to make a selection between road segment A and road segment B, vehicle A sends route planning request information to the RSU. In step S2103, the RSU generates a real-time topology map for vehicle A. In step S2104, the RSU sends the real-time topology map to vehicle A. The real-time topology map may include, for example, average speed information of road segment A and average speed information of road segment B. Assuming that an average speed of road segment A is 18 km/h, and an average speed of road segment B is 10 km/h, in step S2105, vehicle A may select road segment A having a good circulation. As described above, according to the embodiments of the present disclosure, vehicle A may select a suitable road segment based on the real-time topology map, thereby improving the traffic efficiency of the vehicle.

The application examples of the present disclosure are described above by way of example. It should be noted that the embodiments of the present disclosure are not limited to these application examples. The embodiments of the present disclosure may be widely applied to various processes of the Internet of Vehicles, to optimize the information transmission process in the Internet of Vehicles.

The electronic device 200 and the electronic device 900 according to the present disclosure may be implemented as electronic device applied in a vehicle. For example, the electronic device 200 and the electronic device 900 may be arranged in a vehicle or be integrated in a terminal device of the vehicle. The terminal device may be implemented as a mobile terminal (such as a smartphone, a tablet personal computer (PC), a notebook PC, a portable game terminal, a portable/dongle-type mobile router, and a digital camera device), or an in-vehicle terminal (such as a car navigation device). The terminal device may also be implemented as a terminal (which is also referred to as a machine type communication (MTC) terminal) that performs machine-to-machine (M2M) communication. In addition, the terminal device may be a wireless communication module (such as an integrated circuit module including a single wafer) installed on each of the user equipment.

The electronic device 200 according to the present disclosure may be implemented as an RSU.

APPLICATION EXAMPLES OF A TERMINAL DEVICE

First Application Example

Figure 22:
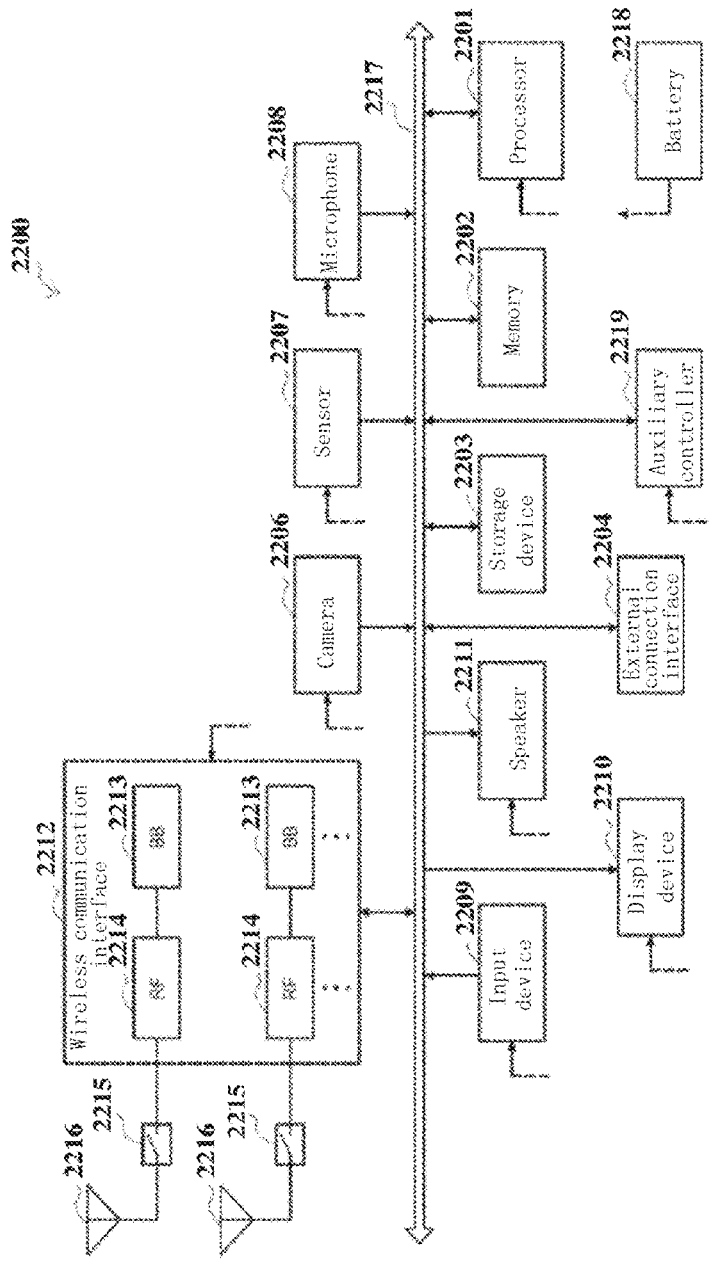
FIG. 22 is a block diagram showing an example of a schematic configuration of a smartphone.

FIG. 22 is a block diagram showing an example of a schematic configuration of a smartphone 2200 to which the technology of the present disclosure may be applied. The smartphone 2200 includes a processor 2201, a memory 2202, a storage device 2203, an external connection interface 2204, a camera 2206, a sensor 2207, a microphone 2208, an input device 2209, a display device 2210, a speaker 2211, a wireless communication interface 2212, one or more antenna switches 2215, one or more antennas 2216, a bus 2217, a battery 2218 and an auxiliary controller 2219.

The processor 2201 may be, for example, a CPU or a system on chip (SoC), and controls functions of an application layer and other layers of the smartphone 2200. The memory 2202 includes an RAM and an ROM, and stores a program that is executed by the processor 2201 and data. The storage device 2203 may include a storage medium, such as a semiconductor memory and a hard disk. The external connection interface 2204 is an interface configured to connect an external device (such as a memory card and a universal serial bus (USB) device) to the smartphone 2200.

The camera 2206 includes an image sensor (such as a charge coupled device (CCD) and a complementary metal oxide semiconductor (CMOS)), and generates a captured image. The sensor 2207 may include a group of sensors, such as a measurement sensor, a gyroscope sensor, a geomagnetic sensor, and an acceleration sensor. The microphone 2208 converts sound inputted to the smartphone 2200 into an audio signal. The input device 2209 includes, for example, a touch sensor configured to detect touch on a screen of the display device 2210, a keypad, a keyboard, a button, or a switch, and receives operations or information inputted from a user. The display device 2210 includes a screen (such as a liquid crystal display (LCD) and an organic light emitting diode (OLED) display), and displays an output image of the smartphone 2200. The speaker 2211 converts an audio signal outputted from the smartphone 2200 into sound.

The wireless communication interface 2212 supports any cellular communication scheme (such as LTE and LTE-advanced), and performs wireless communication. The wireless communication interface 2212 may include, for example, a BB processor 2213 and ail RF circuit 2214. The BB processor 2213 may perform, for example, encoding/decoding, modulating/demodulating and multiplexing/de-multiplexing, and perform various types of signal processing for wireless communication. The RF circuit 2214 may include, for example, a mixer, a filter and an amplifier, and sends and receives a wireless signal via the antenna 2216. The wireless communication interface 2212 may be a chip module on which the BB processor 2213 and the RF circuit 2214 are integrated. As shown in FIG. 22, the wireless communication interface 2212 may include multiple BB processors 2213 and multiple RF circuitries 2214. Although FIG. 22 shows an example in which the wireless communication interface 2212 includes multiple BB processors 2213 and multiple RF circuits 2214, the wireless communication interface 2212 may include a single BB processor 2213 or a single RF circuit 2214.

In addition to the cellular communication scheme, the wireless communication interface 2212 may support another type of wireless communication scheme, such as a short-range wireless communication scheme, a near field communication scheme, and a wireless local area network (LAN) scheme. In this case, the wireless communication interface 2212 may include a BB processor 2213 and an RF circuit 2214 for each wireless communication scheme.

Each of the antenna switches 2215 switches connection destinations of the antennas 2216 among multiple circuitries (for example, circuitry for different wireless communication schemes) included in the wireless communication interface 2212.

Each of the antennas 2216 includes a single or multiple antenna elements (such as multiple antenna elements included in an MIMO antenna), and is used for the wireless communication interface 2212 to send and receive wireless signals. As shown in FIG. 22, the smartphone 2200 may include multiple antennas 2216. Although FIG. 22 shows an example in which the smartphone 2200 includes the multiple antennas 2216, the smartphone 2200 may also include a single antenna 2216.

In addition, the smartphone 2200 may include an antenna 2216 for each type of wireless communication scheme. In this case, the antenna switches 2215 may be omitted from the configuration of the smartphone 2200.

The processor 2201, the memory 2202, the storage device 2203, the external connection interface 2204, the camera 2206, the sensor 2207, the microphone 2208, the input device 2209, the display device 2210, the speaker 2211, the wireless communication interface 2212, and the auxiliary controller 2219 are connected to each other via the bus 2217, The battery 2218 supplies power to blocks of the smartphone 2200 shown in FIG. 22 via a feeders which are partially shown as dashed lines in FIG. 22. The auxiliary controller 2219, for example, operates a minimum necessary function of the smartphone 2200 in a sleep mode.

In the smartphone 2200 shown in FIG. 22, the determination unit 210, the message generation unit 220, the request information generation unit 240, and the topology map generation unit 250 that are shown in FIG. 2 and the determination unit 920 that is shown in FIG. 9 may be implemented by the processor 2201 or the auxiliary controller 2219. At least a part of functions may be implemented by the processor 2201 or the auxiliary controller 2219. For example, the processor 2201 or the auxiliary controller 2219 may perform functions of determining a relay vehicle, generating a vehicle-related message, generating request information for requesting a topology map, generating a real-time topology map, and determining whether the received message includes information of the electronic device by executing instructions stored in the memory 2202 or the storage device 2203.

Second Application Example

Figure 23:
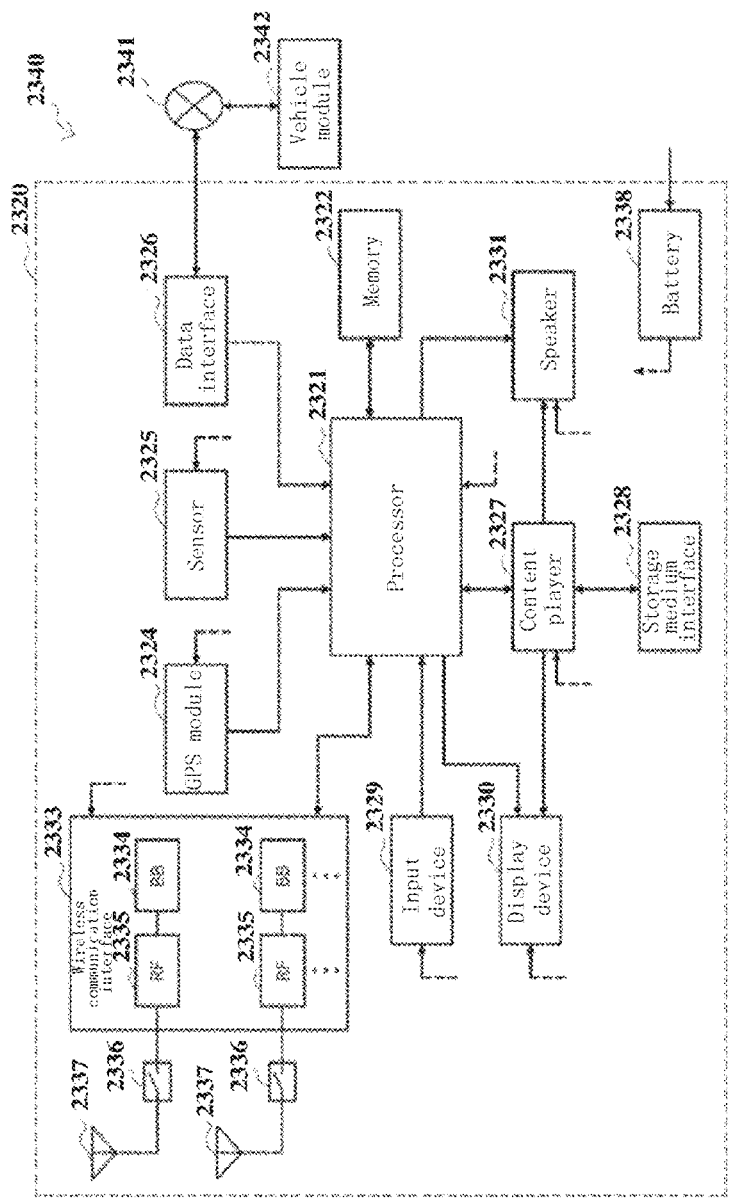
FIG. 23 is a block diagram showing an example of a schematic configuration of a car navigation device.

FIG. 23 is a block diagram showing an example of a schematic configuration of a car navigation device 2320 to which the technology of the present disclosure may be applied.

The car navigation device 2320 includes a processor 2321, a memory 2322, a global positioning system (GPS) module 2324, a sensor 2325, a data interface 2326, a content player 2327, a storage medium interface 2328, an input device 2329, a display device 2330, a speaker 2331, a wireless communication interface 2333, one or more antenna switches 2336, one or more antennas 2337 and a battery 2338.

The processor 2321 may be, for example, a CPU or an SoC, and controls a navigation function and other functions of the car navigation device 2320. The memory 2322 includes an RAM and an ROM, and stores a program that is executed by the processor 2321 and data.

The GPS module 2324 measures a position (such as a latitude, a longitude and an altitude) of the car navigation device 2320 based on a GPS signal received from a GPS satellite. The sensor 2325 may include a group of sensors, such as a gyroscope sensor, a geomagnetic sensor and an air pressure sensor. The data interface 2326 is connected to, for example, an in-vehicle network 2341 via a terminal that is not shown, and acquires data (such as vehicle speed data) generated by the vehicle.

The content player 2327 reproduces content stored in a storage medium (such as a CD and a DVD), which is inserted into the storage medium interface 2328. The input device 2329 includes, for example, a touch sensor configured to detect touch on a screen of the display device 2330, a button, or a switch, and receives operations or information inputted from a user. The display device 2330 includes a screen, such as an LCD or an OLED display, and displays an image with a navigation function or a reproduced content. The speaker 2331 outputs a sound with a navigation function or a reproduced content.

The wireless communication interface 2333 supports any cellular communication scheme (such as LTE and LTE-advanced), and performs wireless communication. The wireless communication interface 2333 may generally include, for example, a BB processor 2334 and an RF circuit 2335. The BB processor 2334 may perform, for example, encoding/decoding, modulating/demodulating, and multiplexing/de-multiplexing, and performs various types of signal processing for wireless communication. In addition, the RF circuit 2335 may include, for example, a mixer, a filter and an amplifier, and send and receive a wireless signal via the antenna 2337. The wireless communication interface 2333 may also be a chip module on which the BB processor 2334 and the RF circuit 2335 are integrated. As shown in FIG. 23, the wireless communication interface 2333 may include multiple BB processors 2334 and multiple RF circuits 2335. Although FIG. 23 shows an example in which the wireless communication interface 2333 includes multiple BB processors 2334 and multiple RF circuits 2335, the wireless communication interface 2333 may include a single BB processor 2334 or a single RF circuit 2335.

Furthermore, in addition to the cellular communication scheme, the wireless communication interface 2333 may support another type of wireless communication scheme such as a short-range wireless communication scheme, a near field communication scheme, and a wireless LAN scheme. In this case, the wireless communication interface 2333 may include a BB processor 2334 and an RF circuit 2335 for each of the wireless communication schemes.

Each of the antenna switches 2336 switches connection destinations of the antennas 2337 among multiple circuits (for example, circuits for different wireless communication schemes) included in the wireless communication interface 2333.

Each of the antennas 2337 includes one or more antenna elements (such as multiple antenna elements included in an MIMO antenna), and is used for the wireless communication interface 2333 to send and receive wireless signals. As shown in FIG. 23, the car navigation device 2320 may include multiple antennas 2337. Although FIG. 23 shows an example in which the car navigation device 2320 includes the multiple antennas 2337, the car navigation device 2320 may also include a single antenna 2337.

Furthermore, the car navigation device 2320 may include an antenna 2337 for each of the wireless communication schemes. In this case, the antenna switch 2336 may be omitted from the configuration of the car navigation device 2320.

The battery 2338 supplies power to each of the blocks of the car navigation device 2320 shown in FIG. 23 via feeders which are partially shown with dashed lines in FIG. 23. The battery 2338 accumulates power supplied from the vehicle.

In the car navigation device 2320 shown in FIG. 23, the determination unit 210, the message generation unit 220, the request information generation unit 240, and the topology map generation unit 250 that are shown in FIG. 2 and the determination unit 920 that is shown in FIG. 9 may be implemented by the processor 2321. At least a part of functions may be implemented by the processor 2321. For example, the processor 2321 may perform functions of determining a relay vehicle, generating a vehicle-related message, generating request information for requesting a topology map, generating a real-time topology map, and determining whether the received message includes information of the electronic device by executing instructions stored in the memory 2322.

The technology of the present disclosure may also be implemented as an in-vehicle system (or a vehicle) 2340 including one or more blocks of the car navigation device 2320, the in-vehicle network 2341 and a vehicle module 2342. The vehicle module 2342 generates vehicle data (such as a vehicle speed, a motor speed and fault information), and outputs the generated data to the in-vehicle network 2341.

The preferred embodiments of the present disclosure are described above with reference to the drawings. Apparently, the present disclosure is not limited to the above examples. Those skilled in the art may make various alternations and modifications within the scope of the appended claims, and it should be understood that these alternations and modifications shall naturally fall within the technical scope of the present disclosure.

For example, the units shown in dashed boxes in the functional block diagrams shown in the drawings indicate that the functional units are optional in the corresponding device, and the various optional functional units may be combined in an appropriate manner to perform desired functions.

For example, the functions included in one unit according to the above embodiments may be realized by separate devices. Alternately, the functions implemented by multiple units in the above embodiments may be implemented by separate devices, respectively. In addition, one of the above functions may be implemented by multiple units. It should be understood that the above configurations are included in the technical scope of the present disclosure.

In this specification, the steps described in the flowcharts may be performed in the chronological order described herein, and may be performed in parallel or independently rather than necessarily in the chronological order. Further, the chronological order in which the steps are performed may be changed appropriately.

Although the embodiments of the present disclosure have been described above in detail in connection with the drawings, it should be understood that the embodiments described above are only illustrative rather than limitative of the present disclosure. For those skilled in the art, various modifications and variations may be made to the embodiments described above without departing from the spirit and scope of the present disclosure. Therefore, the scope of the present disclosure is defined only by the appended claims and their equivalents.

The invention claimed is:

1. An electronic device, comprising processing circuitry configured to:
   determine one or more relay vehicles required to forward a vehicle-related message;
   generate the vehicle-related message, wherein the message comprises information about the one or more relay vehicles; and
   send the message,
   wherein the processing circuitry is further configured to:
   determine the one or more relay vehicles based on a real-time topology map in a predetermined range, wherein the real-time topology map comprises real-time position information of all vehicles in the predetermined range;
   determine a propagation path of the message;
   project vehicles in the real-time topology map onto the propagation path of the message to generate a projection topology map;
   determine the one or more relay vehicles based on positions of vehicles in the projection topology map, wherein the real-time topology map further comprises communication quality information of all the vehicles in the predetermined range;
   determine the one or more relay vehicles based on the communication quality information of all the vehicles in the predetermined range;

cluster the vehicles in the predetermined range into classes based on the communication quality information;

determine a center of each of the classes;

determine, for each pair of adjacent centers, a midpoint of a line between the pair of adjacent centers; and determine a vehicle, closest to the midpoint of each pair of the adjacent centers, as the one or more relay vehicles.

2. The electronic device according to claim 1, wherein the processing circuitry is further configured to:

send request information to a road side unit for requesting the real-time topology map; and receive the real-time topology map from the road side unit.

3. The electronic device according to claim 2, wherein the processing circuitry is further configured to:

receive the real-time topology map using a map message.

4. The electronic device according to claim 1, wherein the processing circuitry is further configured to:

determine, based on position information, speed information and driving route information of the vehicles in the predetermined range, real-time positions of the vehicles; and generate the real-time topology map based on the real-time positions of the vehicles.

5. The electronic device according to claim 1, wherein the communication quality information comprises link loss information and/or signal to interference plus noise ratio information.

6. The electronic device according to claim 1, wherein the information about the one or more relay vehicles comprises at least one of the following information: identification information of each of the relay vehicles, position information of each of the relay vehicles, and message transmission range information of each of the relay vehicles.

7. The electronic device according to claim 1, wherein the vehicle-related message comprises a basic safety message, a road side unit message, and a road side safety message.

8. The electronic device according to claim 1, wherein the electronic device is a road side unit or a vehicle.

9. A wireless communication method performed by an electronic device, comprising:

determining one or more relay vehicles required to forward a vehicle-related message;

generating the vehicle-related message, wherein the message comprises information about the one or more relay vehicles; and sending the message, wherein the method further comprises:

determining the one or more relay vehicles based on a real-time topology map in a predetermined range, wherein the real-time topology map comprises real-time position information of all vehicles in the predetermined range;

determining a propagation path of the message;

projecting vehicles in the real-time topology map onto the propagation path of the message to generate a projection topology map;

determining the one or more relay vehicles based on positions of vehicles in the projection topology map, wherein the real-time topology map further comprises communication quality information of all the vehicles in the predetermined range;

determining the one or more relay vehicles based on the communication quality information of all the vehicles in the predetermined range;

clustering the vehicles in the predetermined range into classes based on the communication quality information;

determining a center of each of the classes;

determining, for each pair of adjacent centers, a midpoint of a line between the pair of adjacent centers; and determining a vehicle closest to the midpoint of each pair of the adjacent centers, as the one or more relay vehicles.

10. The wireless communication method according to claim 9, further comprising:

sending request information to a road side unit for requesting the real-time topology map; and receiving the real-time topology map from the road side unit.

11. The wireless communication method according to claim 10, wherein the receiving the real-time topology map comprises:

receiving the real-time topology map using a map message.

* * * * *